(12) United States Patent
Watanabe et al.

(10) Patent No.: US 10,502,888 B2
(45) Date of Patent: Dec. 10, 2019

(54) LIGHTING DEVICE AND DISPLAY DEVICE

(71) Applicant: SHARP KABUSHIKI KAISHA, Sakai, Osaka (JP)

(72) Inventors: Hisashi Watanabe, Sakai (JP); Ryuzo Yuki, Sakai (JP); Shinya Kadowaki, Sakai (JP); Mitsuhiro Murata, Sakai (JP); Takeshi Ishida, Sakai (JP); Takeshi Masuda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 86 days.

(21) Appl. No.: 15/551,760

(22) PCT Filed: Feb. 12, 2016

(86) PCT No.: PCT/JP2016/054063
§ 371 (c)(1),
(2) Date: Aug. 17, 2017

(87) PCT Pub. No.: WO2016/133008
PCT Pub. Date: Aug. 25, 2016

(65) Prior Publication Data
US 2018/0024290 A1 Jan. 25, 2018

(30) Foreign Application Priority Data
Feb. 19, 2015 (JP) ................ 2015-030598

(51) Int. Cl.
*F21V 8/00* (2006.01)
(52) U.S. Cl.
CPC ........... *G02B 6/0083* (2013.01); *G02B 6/005* (2013.01); *G02B 6/0068* (2013.01); *G02B 6/0091* (2013.01)

(58) Field of Classification Search
CPC .... G02B 6/0021; G02B 6/005; G02B 6/0055; G02B 6/0066; G02B 6/0068; G02B 6/0081; G02B 6/0083; G02B 6/0086; G02B 6/0088; G02B 6/009; G02B 6/0091; G02F 1/133308; G02F 1/133524; G02F 1/1336;
(Continued)

(56) References Cited
U.S. PATENT DOCUMENTS 7,413,333 B2 * 8/2008 Ota ................ G09G 3/3406
362/612
8,337,066 B2 * 12/2012 Yeh ................ G02B 6/0021
362/612

(Continued)

FOREIGN PATENT DOCUMENTS

| JP | 2001-076525 A | 3/2001 |
| JP | 2008-117595 A | 5/2008 |
| JP | 2009-199971 A | 9/2009 |

*Primary Examiner* — Thien M Le
*Assistant Examiner* — April A Taylor
(74) *Attorney, Agent, or Firm* — ScienBiziP, P.C.

(57) ABSTRACT

A lighting device includes a light guide plate (14) having a light exit surface (14A) having a substantially circular shape and a light entrance surface (14C) extending along an entire periphery of an outer edge of the light exit surface (14A), an LED (31A) opposite the light entrance surface (14C), and an LED (32A) that is opposite the light entrance surface (14C) and is connected in parallel to the LED (31A) and the LED (32A) is arranged opposite from the LED (31A) with having a center (C1) of the light exit surface (14A) therebetween.

4 Claims, 12 Drawing Sheets

(58) Field of Classification Search
CPC ......... G02F 1/133602; G02F 1/133603; G02F 1/133608; G02F 1/133615; G02F 2001/133613
See application file for complete search history.

(56) References Cited

U.S. PATENT DOCUMENTS

| | | | |
|---|---|---|---|
| 9,703,031 B2 * | 7/2017 | Sahlhoff | G02B 6/003 |
| 9,946,007 B2 * | 4/2018 | Sahlhoff | G02B 6/003 |
| 2012/0106198 A1 * | 5/2012 | Lin | G02B 6/0083 362/609 |

* cited by examiner

LIGHTING DEVICE AND DISPLAY DEVICE

TECHNICAL FIELD

The present invention relates to a lighting device and a display device.

BACKGROUND ART

An example of a lighting device included in a display device is disclosed in Patent Document 1. The lighting device of Patent Document 1 includes light sources and a circular light guide member. The light sources are arranged to surround a periphery of the light guide member and light from each of the light sources enters the light guide member and exits the light guide member through an upper surface thereof.

RELATED ART DOCUMENT

Patent Document

Patent Document 1: Japanese Unexamined Patent Application Publication No. 2009-199971

Problem to be Solved by the Invention

In a configuration of the lighting device including the light sources, for example, the light sources maybe connected in series. In such a configuration, if any one of the light sources is disconnected, all the light sources are turned off and displayed images cannot be seen and the display device cannot be used.

DISCLOSURE OF THE PRESENT INVENTION

The technology disclosed herein was made in view of the above circumstances and an object is to reduce effects on display if disconnection of a light source occurs.

Means for Solving the Problem

A lighting device according to the present technology includes a light guide plate having a light exit surface having a substantially circular shape and a light entrance surface extending along an entire periphery of an outer edge of the light exit surface, a first light source opposite the light entrance surface, and a second light source opposite the light entrance surface, the second light source that is connected in parallel to the first light source or connected to a power supply different from a power supply that is connected to the first light source, the second light source arranged opposite from the first light source with having a center of the light exit surface therebetween.

According to such a configuration, two types of light sources (the first light source and the second light source) that are not connected in series are included. According to such a configuration, if one of the light sources is disconnected, another one of the light sources is not turned off and disconnection is less likely to affect display. The first light source and the second light source are arranged opposite each other with having the center of the light exit surface therebetween. Therefore, luminance unevenness is less likely to be caused in light exiting through the light exit surface. The arrangement that the second light source arranged opposite from the first light source with having the center of the light exit surface therebetween means that the first light source and the second light source are on opposite sides with respect to the center of the light exit surface and does not necessarily mean that a line connecting the center of the light exit surface and the first light source and a line connecting the center of the light exit surface and the second light source form an angle of 180°.

In the above configuration, the first light source may include first light sources that are arranged in a circumferential direction of the light entrance surface, the first light sources may be connected in series, the second light source may include second light sources that are arranged in the circumferential direction of the light entrance surface, and the second light sources may be connected in series.

In a configuration including light sources, if all the light sources are connected in parallel, difference may be caused in current flowing each of the light sources due to individual difference and luminance unevenness is likely to be caused. In the present technology, the light sources are connected in series and luminance unevenness is less likely to occur in each of the light sources that are connected in series.

The first light sources and the second light sources may be arranged alternately in the circumferential direction of the light entrance surface. The first light source and the second light source are arranged alternately. Therefore, even if the light sources included in one of the light source groups (for example, the first light sources) are turned off, luminance is less likely to be lowered locally in the circumferential direction of the light entrance surface.

The first light sources may be arranged at equal intervals in an annular shape having a center corresponding to the center of the light exit surface and a number of the first light sources is an odd number, and the second light sources may be arranged at equal intervals in an annular shape having a center corresponding to the center of the light exit surface and a number of the second light sources is an odd number.

The odd number of light sources are arranged in an annular shape at equal intervals, and the light sources are not arranged opposite each other with having the center of the light exit surface therebetween. In the present technology, the first light sources are less likely to be arranged opposite each other and the second light sources are less likely to be arranged opposite each other. Accordingly, the opposing two light sources are less likely to be turned off simultaneously due to the disconnection.

The first light sources and the second light sources may be at least included in light sources, a total number of the light sources may be an even number, and the light sources may be arranged at equal intervals in an annular shape having a center corresponding to the center of the light exit surface. In the configuration that the light sources are arranged at equal intervals and the total number of the light sources is an even number, one light source and another light source are arranged at an interval of an angle of 180°. Accordingly, an edge portion of the light exit surface on an opposite side from, the one light source will not be dark and luminance unevenness is less likely to be caused.

The first light sources and the second light sources may be at least included in light sources, a total number of the light sources may be an odd number, the light sources may be arranged at equal intervals in an annular shape having a center corresponding to the center of the light exit surface, and a value obtained by (R1*circumference of ratio)/N may be 10 mm or less, R1 is a distance between each of the light sources and the center of the light exit surface, and N is the total number of the light sources.

A value obtained by (R1*circumference of ratio)/N corresponds to a value obtained by dividing an interval between two adjacent light sources in the circumferential direction by two. If the value is 10 mm or less, the two adjacent light sources are closer to each other and a portion between the two adjacent light sources is less likely to be a dark portion.

To solve the above problem, a display device according to the present technology includes the lighting device, and a display panel display with using light from the lighting device. According to such a configuration, a display device that reduces effect on display due to occurrence of disconnection is provided.

Advantageous Effect of the Invention

According to the technology disclosed in this specification, occurrence of disconnection of the light source is less likely to affect display.

MODES FOR CARRYING OUT THE INVENTION

<First Embodiments>

Figure 1:
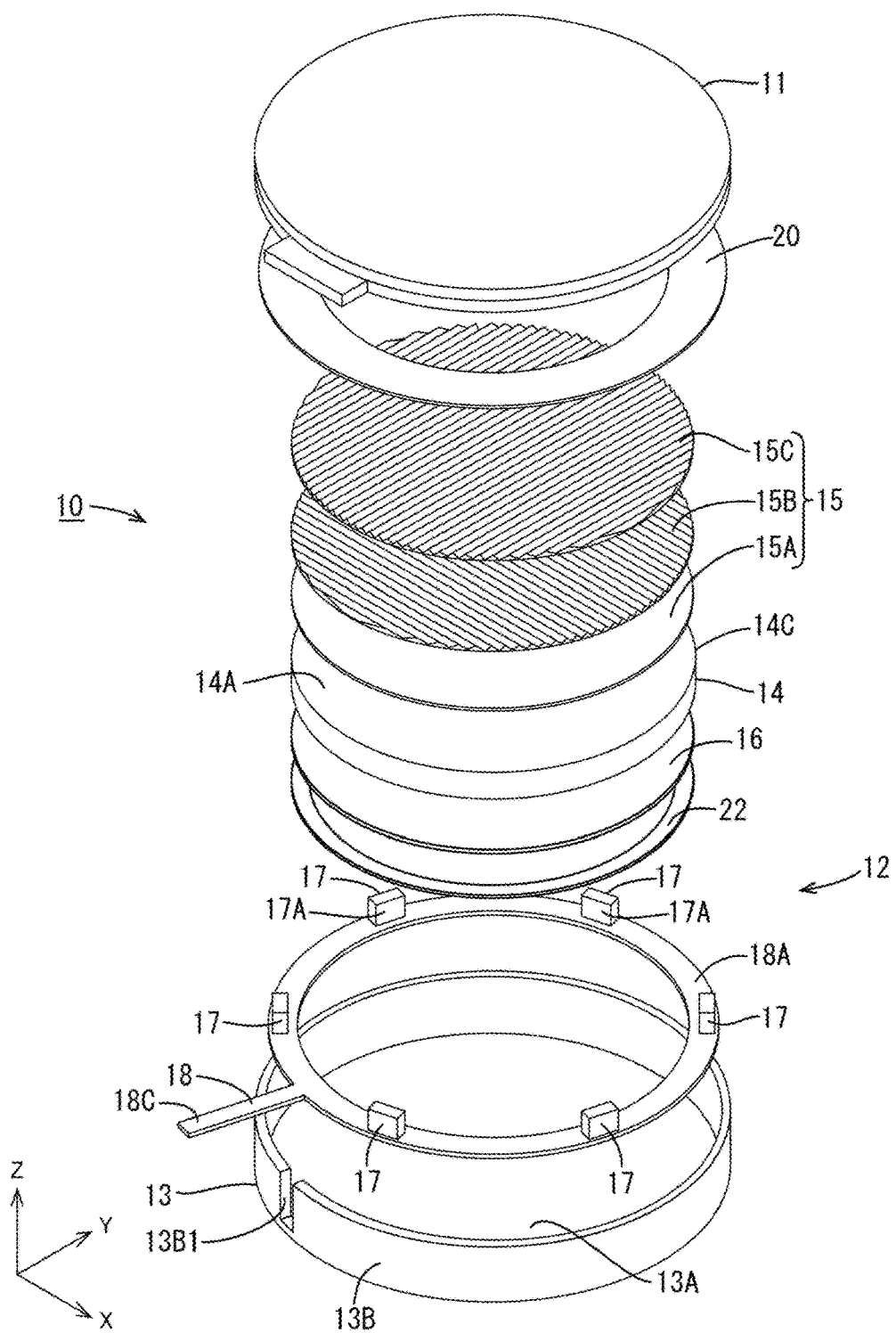
FIG. 1 is an exploded perspective view illustrating a liquid crystal display device according to a first embodiment.
Figure 2:
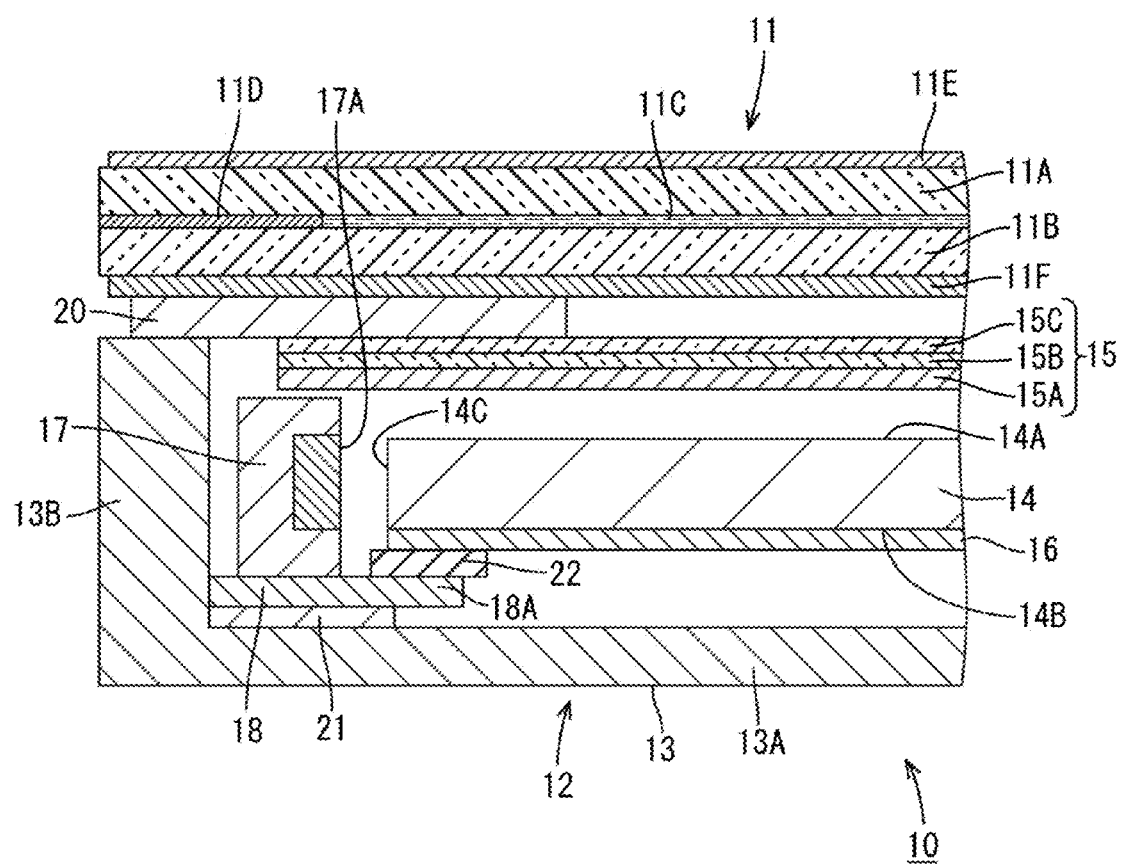
FIG. 2 is a cross-sectional view of the liquid crystal display device in FIG. 1 (taken along line II-II in FIG. 3).

A first embodiment will be described with reference to FIGS. 1 to 7. In the present embodiment, a liquid crystal display device 10 (a display device) including a liquid crystal panel 11 will be described. A vertical direction in FIGS. 1 and 2 is a reference vertical direction of the liquid crystal panel 11 and an upper-side and a lower side in FIGS. 1 and 2 are a front side and a rear side, respectively. X-axis, Y-axis and Z-axis may be indicated in the drawings. The axes in each drawing correspond to the respective axes in other drawings.

FIG. 1 is an exploded perspective view illustrating the liquid crystal display device 10. As illustrated in FIG. 1, the liquid crystal display device 10 has a substantially circular shape as a whole. The liquid crystal display device 10 at least includes a liquid crystal panel 11 for displaying images thereon, and a backlight device 12 (a lighting device) arranged on a rear side with respect to the liquid crystal panel 11 and providing light toward the liquid crystal panel 11. The liquid crystal display device 10 may include a bezel (not illustrated) and the bezel and the backlight device 12 may hold an outer peripheral edge portion of the liquid crystal panel 11 therebetween.

The liquid crystal display device 10 according to the present embodiment is preferably used in electronic devices (not illustrated) such as mobile phones (including smart phones), laptop computers (including tablet-type laptop computers), mobile information terminals (including an electronic book and PDA), a digital photo frame, portable video game players, a car navigation system, and an instrumental panel. However, the liquid crystal display device 10 may be used in other devices. The display size of the liquid crystal panel 11 included in the liquid crystal display device 10 is from several inches to a dozen inches. Namely, the liquid crystal panel 11 is generally classified as a small sized or a medium sized panel. However, the display size is not limited thereto.

The liquid crystal panel 11 will be described. The liquid crystal panel 11 is a display panel that displays with using light supplied by the backlight device 12. As illustrated in FIG. 1, the liquid crystal panel 11 has a substantially circular plan view shape as a whole. As illustrated in FIG. 2, the liquid crystal panel 11 mainly includes a pair of glass substrates 11A, 11B that have a substantially circular plan view shape, and a liquid crystal layer 11C between the substrates 11A and 11B. The substrates 11A, 11B are bonded together with a sealing member 11D with keeping a gap of a thickness of the liquid crystal layer 11C therebetween.

The liquid crystal panel 11 includes a display area (an active area) that is substantially circular and in a middle portion of a display screen and a non-display area (a non-active area) that is substantially annular and at an outer peripheral side of the display screen and surrounds the display area. Images appear on the display area and no images appear on the non-display area. Light supplied by the backlight device 12 enters the liquid crystal panel 11 from the rear side and exits through a front surface and accordingly, images appear on the display area of the liquid crystal panel 11. Polarizing plates 11E, 11F are bonded to outer surfaces of the substrates 11A, 11B, respectively. The liquid crystal panel 11 of the present embodiment is operated in a fringe filed switching (FFS) mode. If the liquid crystal panel 11 has a display area of a perfect circle, the liquid crystal panel is used with a touch panel and a position sensor to achieve a user interface (UI) with which liquid crystal display is rotatable.

One of the substrates 11A, 11B on the front (a front-surface side) is a color filter (CF) substrate 11A and the other one of the substrates 11A, 11B on the rear (a rear-surface side) is an array substrate 11B. The array substrate 11B has an outer peripheral edge a part of which extends outward from that of the CF substrate 11A and terminals (not illustrated) are mounted on the extended port ion. The terminals are connected to terminals of a flexible printed circuit board (not illustrated) that supplies various signals to the array substrate 11B.

The array substrate 11B includes thin film transistors (TFTs, display component) that are switching components and pixel electrodes that are arranged in a matrix on an inner surface (a surface facing the liquid crystal layer 11C) of a support substrate made of glass. Source lines and gate lines are arranged in a matrix around the TFTs. A gate driver is mounted on the support substrate. A common electrode is mounted on the array substrate 11B to be opposite the pixel electrodes. The pixel electrodes and the common electrode are made of a transparent electrode film, such as indium tin oxide (ITO) or zincoxide (ZnO). Oxide semiconductor is used as an active layer of the TFT.

The CF substrate 11A includes a support substrate made of glass and color filters formed on an inner surface side of the support substrate. The color filters include red (R), green (G), and blue (B) color filters that are arranged in a matrix. A light blocking layer (a black matrix) is formed between the color filters. Alignment films (not illustrated) are provided on an inner surface side of the substrates 11A, 11B, respectively, to align the liquid crystal molecules in the liquid crystal layer 11C.

Next, the backlight device 12 will be described. The backlight device 12 has a substantially circular plan view shape as a whole similar to that of the liquid crystal panel 11. As illustrated in FIGS. 1 and 2, the backlight device 12 mainly includes a chassis 13 (a casing), a light guide plate 14, optical sheets 15, a light reflection sheet 16, light emitting diodes 17 (LEDs) that are light sources, and am LED board 18 (a light source board) on which the LEDs 17 are mounted.

The chassis 13 has a substantially circular plan view shape similar to that of the liquid crystal panel 11 and has a substantially box shape to be open toward the front side as a whole. The chassis 13 may be molded from synthetic resin and the LED board 18, the light reflection sheet 16, the light guide plate, the optical sheets 15 are arranged in a space within the chassis 13. The chassis 13 includes a substantially circular bottom portion 13A, and a side wall portion 13B that extends from an outer peripheral edge portion of the bottom portion 13A toward the front side. The bottom portion 13A has a plate surface having a certain thickness. The light reflection sheet 16, the light guide plate 14, and the optical sheets 15 are layered on each other in this sequence on the bottom, portion 13A. The side wall portion 13B is a plate member having a certain thickness and has a substantially cylindrical shape (an annular shape) that surrounds the light guide plate 14 and other components on the bottom portion 13A from outer periphery thereof.

A panel fixing tape 20 for fixing the liquid crystal panel 11 to the backlight device 12 is fixed on a distal end portion of the side wall portion 13B facing the front side. The panel fixing tape 20 is a double-sided adhesive tape having light blocking properties and has a substantially annular plan view shape. A rear-side adhesive surface of the panel fixing tape 20 adheres to the distal end portion of the side wall portion 13B and extends from the side wall portion 13B to an outer peripheral edge portion of the optical sheets 15 on a front side thereof. The front-side adhesive surface of the panel fixing tape 20 adheres to an outer peripheral edge portion of the liquid crystal panel 11 on a rear side thereof.

Each LED 17 includes an LED chip (an LED component) that is a semiconductor light emitting component. The LED chip is arranged on a base board that is fixed on a plate surface of the LED board 18 and sealed with resin. The LED chip that emits light in a single color of blue is used. The resin that seals the LED chip contains phosphors dispersed therein. The phosphors emit light in a predetermined color (for example, green, red, yellow) when excited by blue light emitted from the LED chip. The LED 17 emits white light as a whole. Each LED 17 has an external shape of a rectangular parallelpiped.

Figure 3:
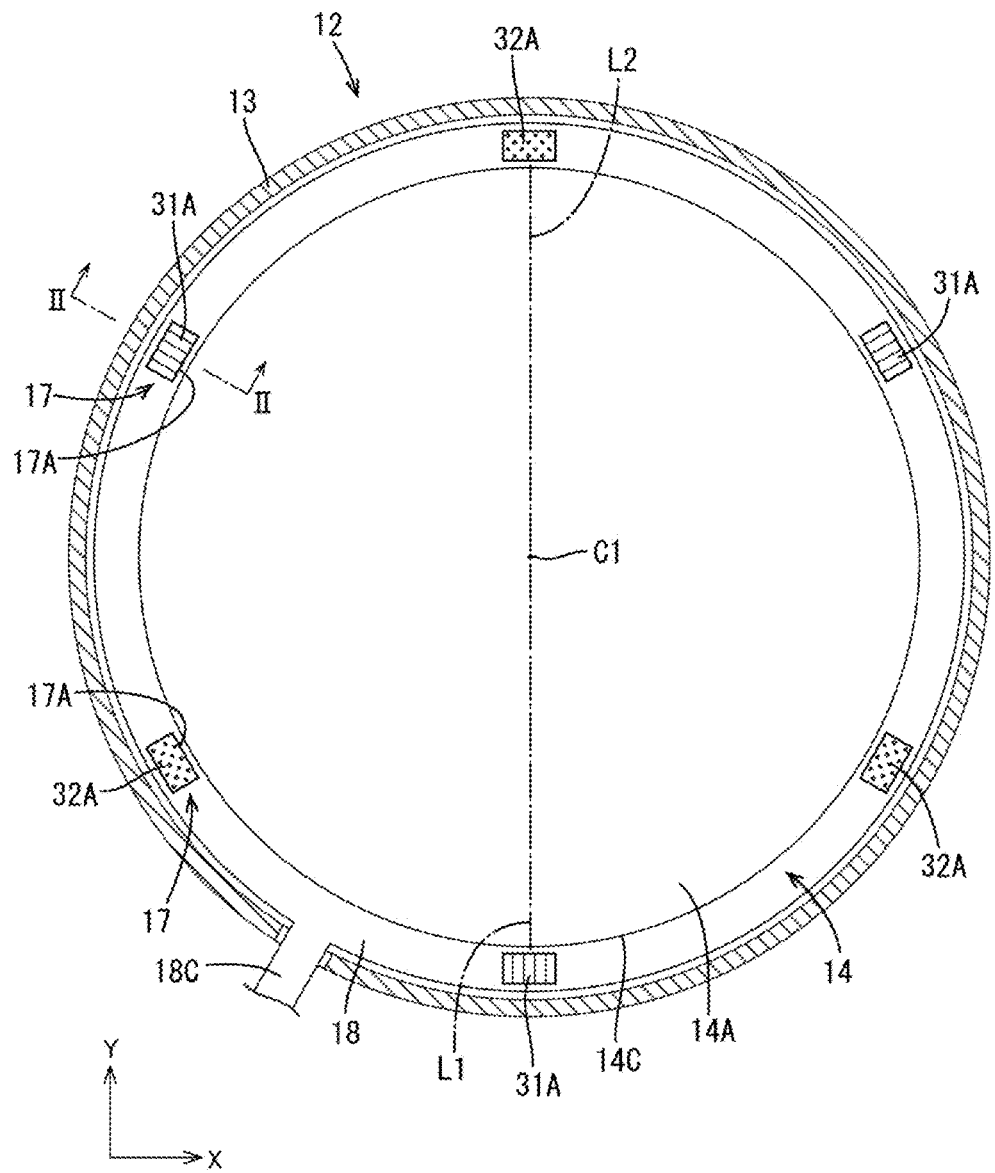
FIG. 3 is a plan view illustrating a backlight device in FIG. 1.
Figure 4:
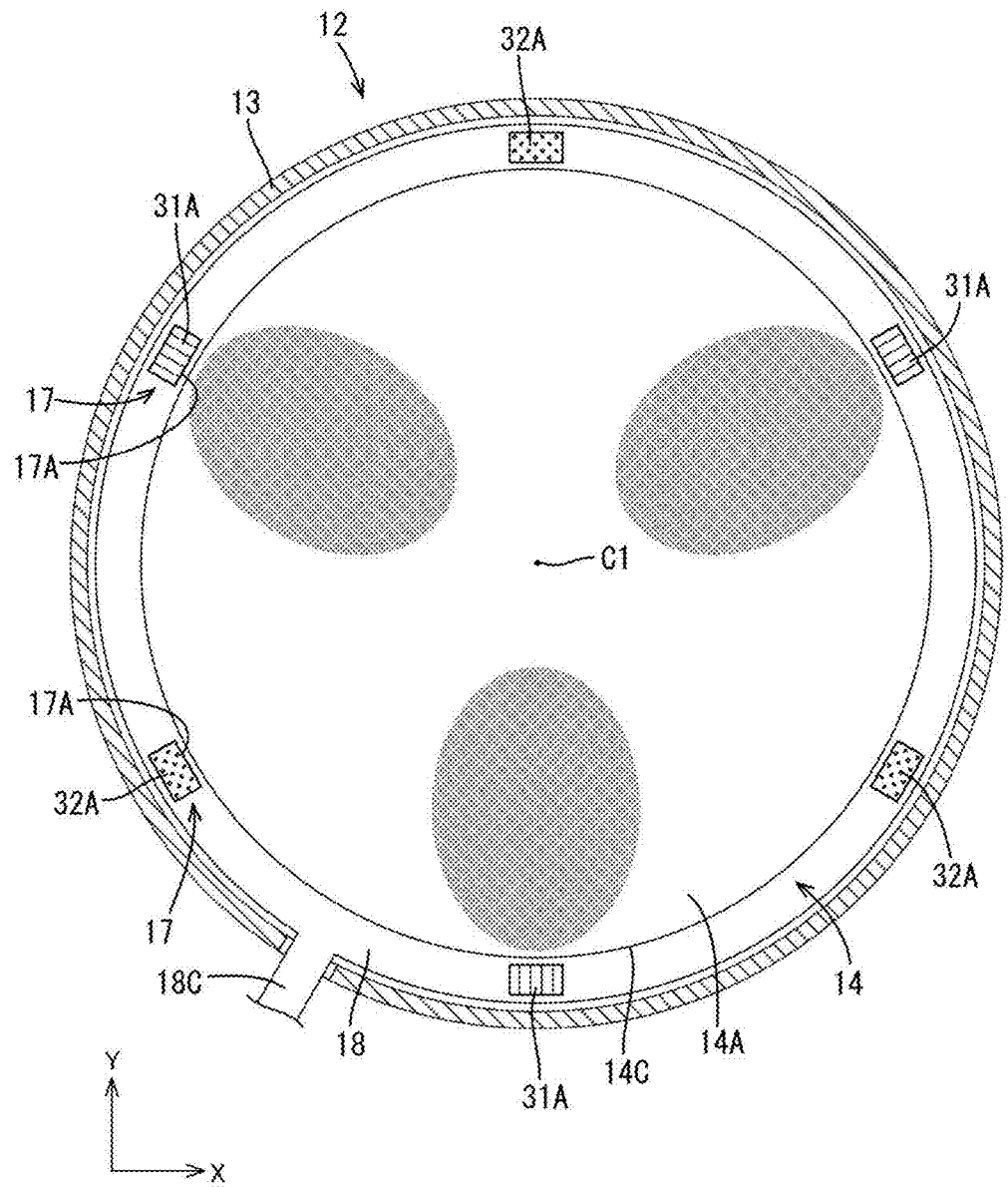
FIG. 4 is a plan view illustrating the backlight device with advantageous effects.

The LED 17 of the present embodiment is a side-surface-emitting type LED. The LED 17 has a mounting surface that is mounted on the LED board 18 and a side surface that is adjacent to the mounting surface and the side surface is a light emission surface 17A. The LED 17 emits light having an optical axis that is parallel to a normal line to the light emission surface 17A. The optical axis is referred to as a traveling direction of rays of light having greatest light emission intensity among the rays of light emitted by the LED 17 and having a certain light distribution. As illustrated in FIG. 3, in the present embodiment, the LEDs 17 are arranged along entire periphery of a light entrance surface 14C (described later) at equal intervals. More specifically, the LEDs 17 are arranged in an annular shape around a center C1 of the light exit surface 14A of the light guide plate 14. The LEDs 17 are arranged such that the light emission surfaces 17A thereof are opposite the light entrance surface 14C of the light guide plate 14. The LEDs 17 are arranged such that each light emission surface 17A faces a center of the LEDs 17 (a center C1 of the light exit surface 14A of the light guide plate 14).

The LED board 18 is a film (sheet) member having flexibility and has a substantially annular plan view shape. The LED board 18 is arranged in the chassis 13 so as to be substantially parallel to a plate surface of the bottom portion 13A. The LED board 18 includes a body portion 18A and an extended portion 18C. The body portion 18A extends along outer periphery of the light guide plate 14 and formed in an annular shape. The extended portion 18C extends outward from, the body portion 18A and has a belt-like shape. The LEDs 17 are mounted, on the body portion 1SA.

The LED board 18 is mainly made of insulation material such as polyimide resin and includes traces (not illustrated) made of copper foil and formed with patterning for supplying power to each of the LEDs 17. As illustrated in FIG. 2, the LED board 18 is bonded on the bottom portion 13A of the chassis 13 via a board fixing tape 21 that adheres on a rear surface of the body portion 18A. The board fixing tape 21 has an annular shape following a shape of the body portion. 18A.

An outer peripheral edge portion of the light reflection sheet 16 is placed on a front surface of an inner peripheral edge portion of the body portion 18A. A sheet fixing tape 22 made of a double-sided adhesive tape having a light blocking property is disposed between the inner peripheral edge portion of the LED board 18 and the outer peripheral edge portion of the light reflection sheet 16. The light reflection sheet 16 is fixed on the body portion 18A of the LED board 18 via the sheet fixing tape 22.

The extended portion 18C has a belt-like shape extending outwardly from the outer peripheral edge of the body portion 18A. Apart of the traces is formed on the extended portion 18C. Terminals (not illustrated) that are to be connected to the traces are provided on a distal end portion of the extended portion 18C. The extended port ion 18C is extended outside of the back light device 12 through a cut-off outlet 13B1 that is formed in the side wall portion 13B. The extended portion 18C extended through the outlet 13B1 is folded to the rear side of the bottom portion 13A and the terminals on the distal end portion of the extended portion 18C are mounted on a power supply connector of a LED driving circuit board (not illustrated) that is mounted on a rear side of the bottom portion 13A.

The light guide plate 14 has a substantially circular plan-view shape similar to that of the bottom portion 13A of the chassis 13. The light guide plate 14 is arranged within the chassis 13 so as to be surrounded by the side wall portion 13B. The optical sheets 15 and the liquid crystal panel 11 are arranged on the front side of the light guide plate 14 in this order. A center C1 of the light guide plate 14 matches a center of the LEDs 17 that are arranged in an annular shape with a plan view.

The light guide plate 14 has an outer peripheral edge surface that is opposite the light emission surfaces 17A of the LEDs 17 and is a light entrance surface 14C through which the light from the LEDs 17 enters the light guide plate 14. The light guide plate 14 has a front-side plate surface that is a light exit surface 14A through which the light entering the light guide plate 14 through the light entrance surface 14C exits toward the liquid crystal panel 11 (and toward the optical sheets 15). The light entrance surface 14C has an annular shape extending along an entire periphery of the outer edge of the light exit surface 14A. The light guide plate 14 has a rear-side plate surface (hereinafter, a rear surface 14B) that faces the bottom portion 13A of the chassis 13 and is covered with the light reflection sheet 16. When the light emitted by each LED 17 enters the light guide plate 14 through the light entrance surface 14C, the light travels toward the front side with travelling within the light guide plate 14 and exits the light guide plate 14 through the light exit surface 14A. The light exiting outside the light guide plate 14 transmits through the optical sheets 15 and is supplied to the liquid crystal panel 11.

The light guide plate 14 includes a light reflecting pattern as a light reflecting portion on the rear surface 14B. The light reflecting portion accelerates the light to exit through the light exit surface 14A. The light reflecting portion may be a light reflecting coating material such as white ink or three-dimensional light reflecting obstacles such as an emboss pattern. The light reflecting pattern includes micro dots as the light reflecting portion. As the density of the light reflecting portion in the light reflecting pattern (a distribution density) is higher, the light reflecting ability of the light reflecting pattern increases. The density of the light reflecting portion is increased as is closer to the center of the light guide plate 14 from the outer peripheral edge with respect to the radial direction of the light guide plate 14. Accordingly, uniformity (evenness of luminance) of light exiting through the light exit surface 14A is improved.

The optical sheets 15 include multiple sheets that form a layered component and are disposed on the front side of the light guide plate 14 to overlap the light exit surface 14A. The light exiting the light guide plate 14 transmits through the optical sheets 15 with the optical characteristics of the light being changed. The optical sheets 15 include a diffuser sheet 15A and two lens sheets 15B, 15C. In another embodiment, a reflection type polarizing sheet may be further included. The optical sheets 15 have a substantially circular plan-view shape similarly to the light guide plate 14. The optical sheets 15 are slightly larger than the light guide plate 14.

The reflection sheet 16 has a substantially circular plan-view shape similarly to the light guide plate 14 and is between the bottom wall portion ISA of the chassis 13 and the light guide plate 14. The reflection sheet 16 may be a sheet base member made of white synthetic resin having a highly light reflective surface (for example, a white foamed polyethylene terephthalate sheet). The reflection sheet 16 has a size that can cover an entire area of the rear surface 14B of the light guide plate 14. The light exiting the light guide plate 14 through the rear surface 14B to the outside is reflected by the reflection sheet 16 and returned into the light guide plate 14 and travels toward the front side.

Figure 5:
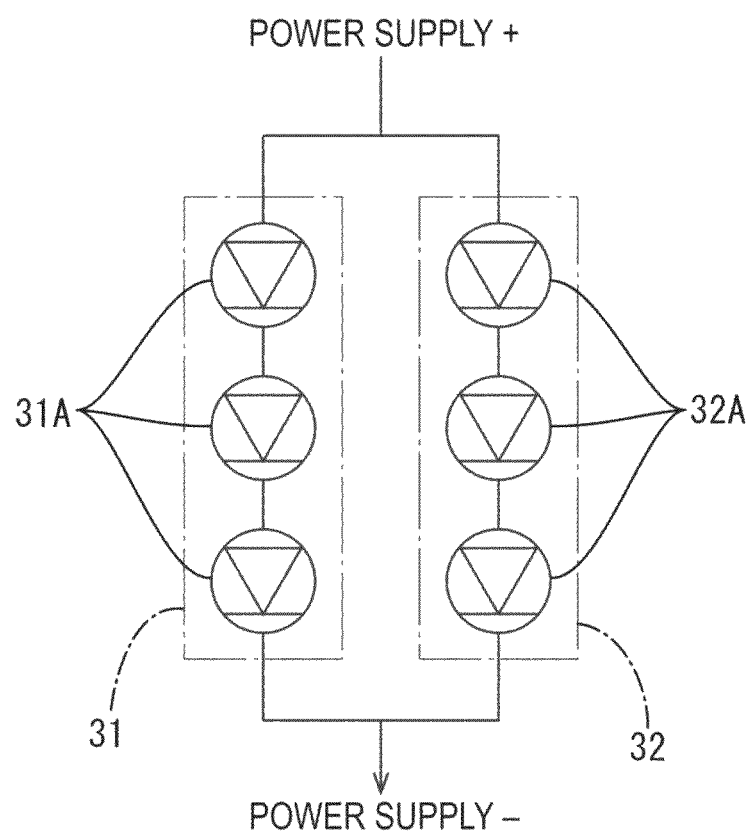
FIG. 5 is a diagram illustrating an electric configuration of LEDs.
Figure 6:
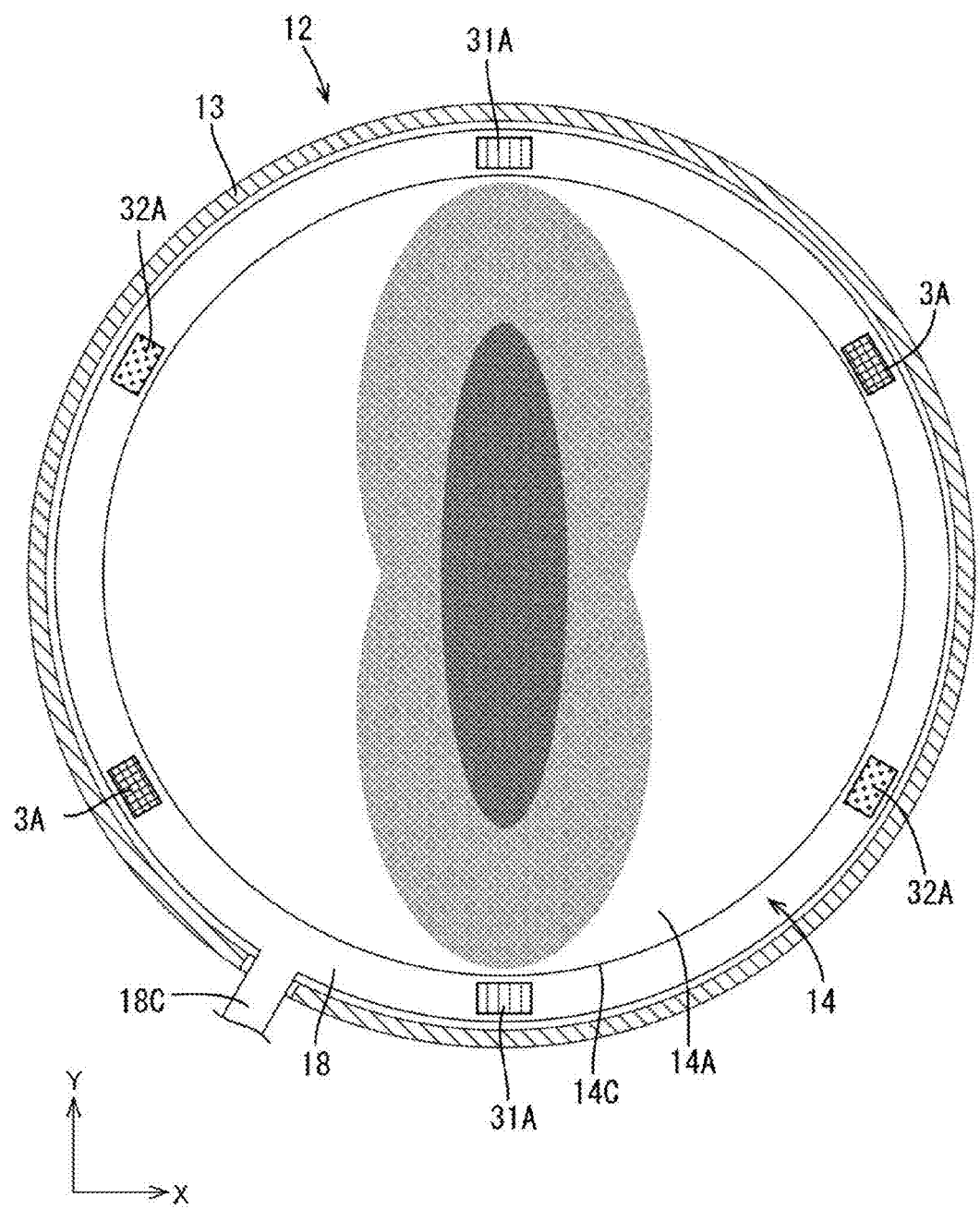
FIG. 6 is a plan view of Comparative Example 1.
Figure 7:
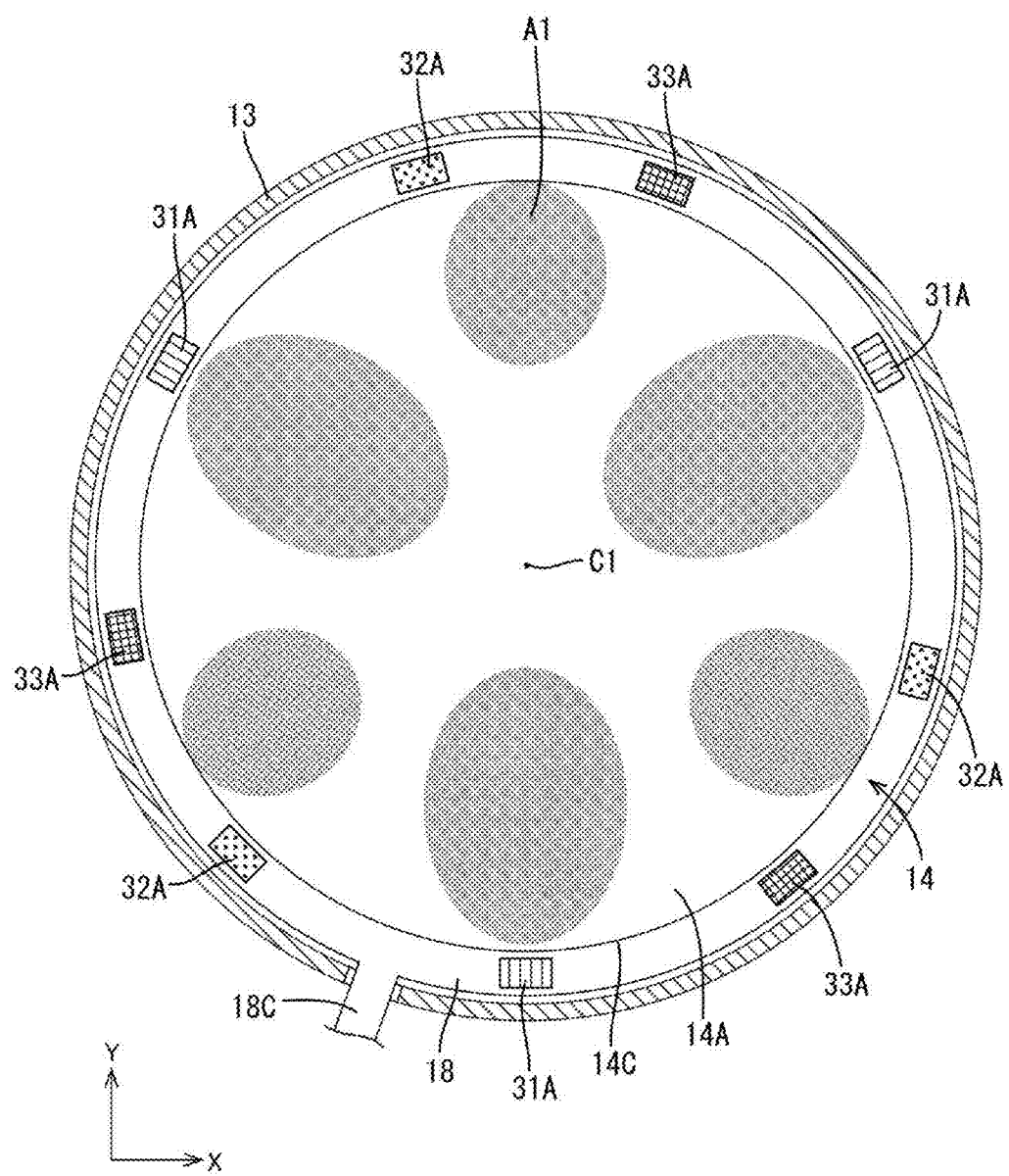
FIG. 7 is a plan view of Comparative Example 2.

Next, an electric configuration and arrangement of the LEDs 17 will be described. In the present embodiment, six LEDs 17 are arranged and divided into two groups. As illustrated in FIG. 5, the LEDs 17 are divided into a first LED group 31 including the LEDs 17 that are connected in series and a second LED group 32 including the LEDs 17 that are connected in series. In the following description and FIGS. 3 to 6, the LEDs 17 included in the first LED group 31 are referred to as LEDs 31A (a first light source) and the LEDs 17 included in the second LED group 31 are referred to as LEDs 32A (a second light source). The first LED group 31 and the second LED group 32 are connected in parallel. The LEDs connected in series (the LEDs included in the same LED group) are illustrated with a same pattern in the drawings.

As illustrated in FIG. 3, in the present embodiment, three (an odd number of) LEDs 31A are arranged along an entire periphery of the light entrance surface 14C at equal intervals (at angular intervals of 120° around a center C1). Namely, the LEDs 31A are arranged in an annular shape around the center C1. Three (an odd number of) LEDs 32A are arranged along an entire periphery of the light entrance surface 14C at equal intervals (at angular intervals of 120° around a center C1). Namely, the LEDs 32A are arranged in an annular shape around the center C1. The LEDs 31A and the LEDs 32A are arranged alternately in a circumferential direction of the light entrance surface 14C. Each of the LEDs 31A and each of the LEDs 32A are arranged opposite each other with having the center C1 therebetween. More specifically, in the present embodiment, with a plan view (seen from, a liquid, crystal panel 11 side), a straight line L1 connecting the center C1 and the LED 31A and a straight line L2 connecting the center C1 and the LED 32A form an angle of 180°.

Effects of the present embodiment will be described. As illustrated in Comparative Example 1 in FIG. 6, the LEDs connected in series are arranged opposite each other. In such a configuration, if any one of the LEDs (for example, the LED 31A) is turned off due to disconnection, the LEDs that are opposite each other are turned off and a linear dark portion may be caused. In Comparative Example in FIG. 6, two LEDs that are connected in series (for example, LEDs 3A, 3A) form a LED group and three LED groups are connected in parallel.

In the present embodiment, the LEDs include two types of LEDs that are not connected in series (the LED 31A and the LED 32A) and the LEDs 31A, 32A are; arranged opposite each other with having the center C1 of the light exit surface 14A therebetween. According to such a configuration, even if one of the LEDs (or a trace connecting in series the LEDs in one LED group) is disconnected (refer FIG. 4), other one of the LEDs is not turned off. Thus, display is less likely to be affected by occurrence of disconnection.

If all the LEDs 17 are connected in parallel, difference may be caused in current flowing each of the LEDs 17 due to individual difference and luminance of each LED 17 may differ, and luminance unevenness is likely to be caused. In the present embodiment, some of the LEDs 17 (the LEDs 31A) are connected in series and therefore, luminance unevenness is less likely to occur in each of the LEDs that are connected in series. The LEDs 31A and the LEDs 32A are arranged alternately. Therefore, even if the LEDs included in one of the LED groups (for example, the first LED group 31) are turned off, luminance is less likely to be lowered locally in the circumferential direction of the light entrance surface 14C.

In the present embodiment, an odd number of the LEDs 31A (or the; LEDs 32A) are connected in series. The odd number of LEDs are arranged in an annular shape at equal intervals and with such a configuration, the odd number of LEDs are not arranged opposite each other with having the center C1 of the light exit surface 14A therebetween. In the present embodiment, the LEDs 31A are less likely to be arranged opposite each other and the LEDs 32A are less likely to be arranged opposite each other. Accordingly, the opposing two light sources are less likely to be turned off simultaneously due to the disconnection.

In the configuration that N (the number) LEDs are arranged at equal intervals, the LEDs are arranged around the C1 at an angular interval of 360/N (°). Therefore, if the even number (N) of LEDs are arranged, a pair of LEDs (that are opposite each other) is necessarily arranged at an angle of 180°. When the number (N) is odd, the above situation is less likely to occur.

In the present embodiment, the number of the LEDs that are connected in series is an odd number and the total of the LEDs 17 is an even number. According to such a configuration, as illustrated in FIG. 3, two LEDs 31A, 32A that are not connected in series are arranged at an angular interval of an angle of 180°. If the odd number of LEDs are arranged at equal intervals as illustrated in Comparative Example 2 in FIG. 7, two LEDs (for example, the LED 31A and the LED 33A) cannot be arranged at the angular intervals of 180°. In such a configuration, when one LED (for example, the LED 31A) is turned off, an area that is opposite from the one LED (for example, an area A1 in FIG. 7) is likely to be dark. In the present embodiment, the LEDs 31A and the LEDs 32A are arranged at an angular interval of 180° and the above descried matter is less likely to occur.

The total number of the LEDs 17 is an even number and therefore, one LED 17 and another LED 17 are arranged at an interval of an angle of 180° with reference to the center C1 of the light exit surface 14A. Accordingly, an edge portion of the light exit surface on an opposite side from the one LED 17 will not be dark.

In the present embodiment, the number of LEDs 31A that are connected in series and the number of LEDs 32A that are connected in series are same. According to such a configuration, a current value of each LED 31A and each LED 32A is same and luminance unevenness is less likely to be caused.

<Second Embodiment>

Figure 8:
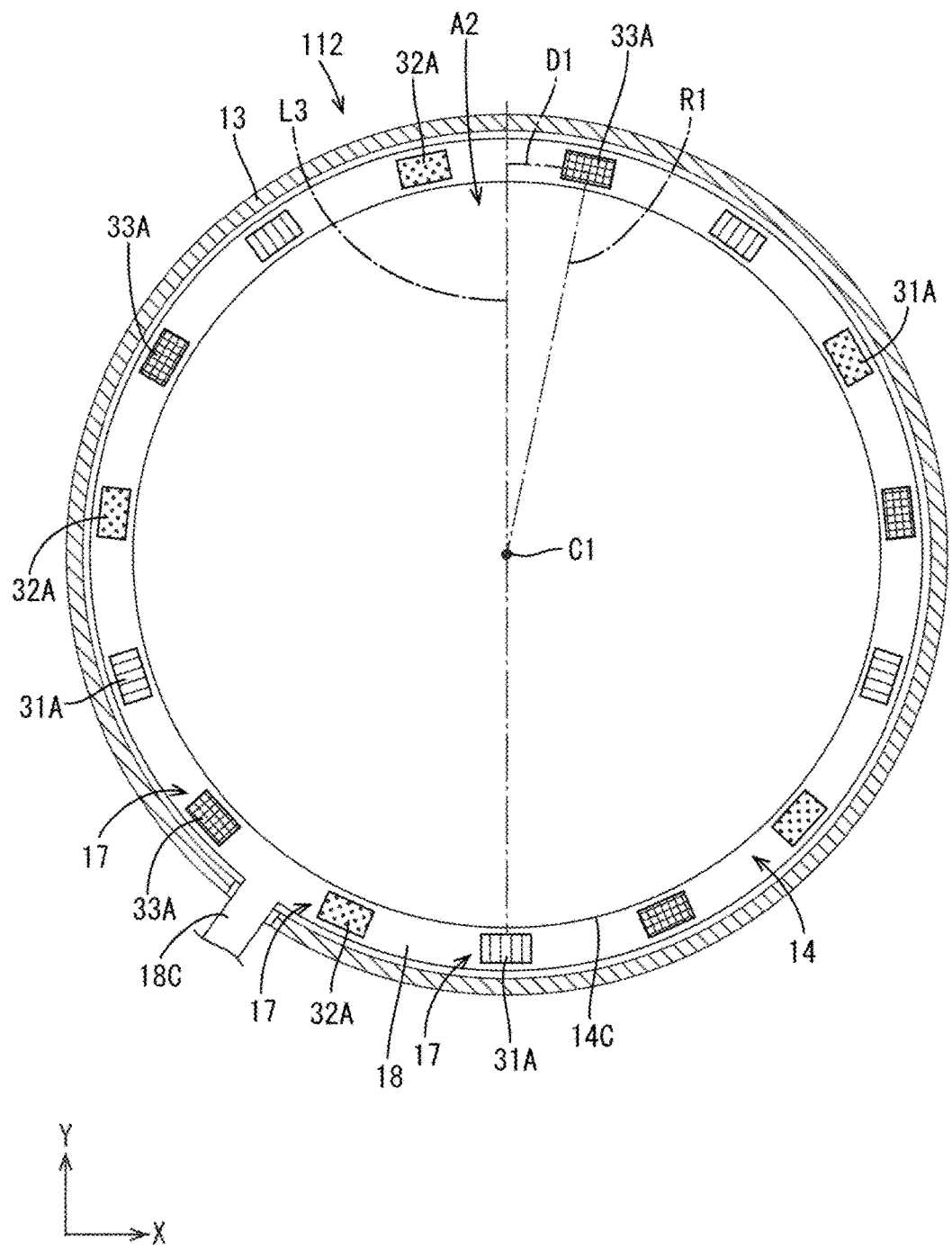
FIG. 8 is a plan view illustrating a backlight device according to a second embodiment.

Next, a second embodiment will be described with reference to FIG. 8. In a backlight device 112 of the present embodiment, a total number of LEDs 17 and an electric configuration of the LEDs 17 differ from those of the above embodiment. Parts that are same as those of the above embodiment are provided with the same numerals or symbols as the above embodiment and will not be described. In the present embodiment, as illustrated in FIG. 8, fifteen LEDs 17 are arranged and divided into three groups. The LEDs 17 are divided into the first LED group 31 including the LEDs 17 that are connected in series, the second LED group 32 including the LEDs 17 that are connected in series, and a third LED group 33 including the LEDs 17 that are connected in series.

Similarly to the above embodiment, the LEDs 17 included in the first LED group 31 are referred to as the LEDs 31A (the first light source), the LEDs 17 included in the second LED group 31 are referred to as the LEDs 32A (the second light source), and the LEDs 17 included in the third LED group 33 are referred to as LEDs 33A (the third light source). The first LED group 31, the second LED group 32, and the third LED group 33 are connected in parallel. The LEDs 17 are arranged in an annular shape and arranged at equal intervals. The LEDs 31A, the LEDs 32A, and the LEDs 33A are arranged alternately along a circumferential direction of the light entrance surface 14C.

In the present embodiment, the total number of the LEDs 17 is odd and therefore, another LED 17 is not arranged on the linear line (a linear line L3) connecting one of the LEDs 17 (for example, the LED 31A) and the center line C1. In such a configuration, if the LED 31A is turned off, a portion of the light exit surface 14A opposite from the LED 31A (for example, an area A2) is likely to be dark. To solve such a problem, it is preferable to increase the total number of the LEDs 17 and decrease the interval between adjacent LEDs 17. Specifically, a value obtained by dividing the interval between the adjacent LEDs 17 by two (D1 in FIG. 8) is set 10 mm or smaller so that the LED 32A (or the LED 33A) is much closer to the straight line L3 and the area A2 is less likely to be a dark portion.

The total number of the LEDs 17 is not necessarily fifteen but may be altered. The portion D1 is a part of an arched portion having the center C1 as a center thereof. Therefore, D1 is represented by a formula of (R1*circumference of ratio)/N wherein R1 is a distance between the LED 17 and the center C1 with a plan view (seen from the light exit surface 14A side), and N is the total number of the LEDs 17 arranged in the backlight device 112. Namely, as is in the present embodiment, if the total number of the LEDs 17 is odd number, it is preferable to set the values of R1 and N such that D1=(R1*circumference of ratio)/N is 10 mm or less. R1 corresponds to a radius of a circle formed by the LEDs 17.

<Other Embodiments>

The present invention is not limited to the embodiments described above with reference to the drawings and the following embodiments may be included in the technical filed of the present invention.

Figure 9:
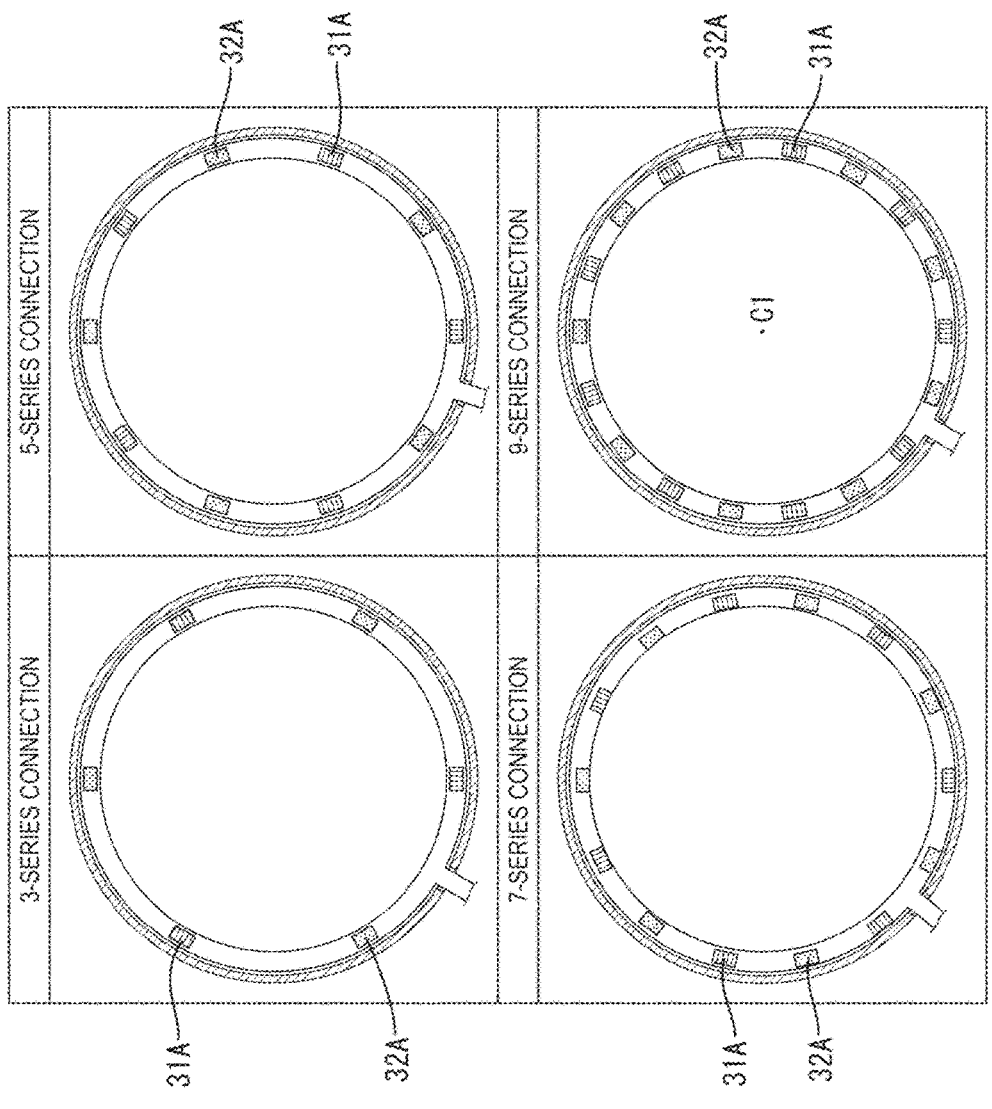
FIG. 9 is a table illustrating a configuration including two LED groups connected in parallel.
Figure 10:
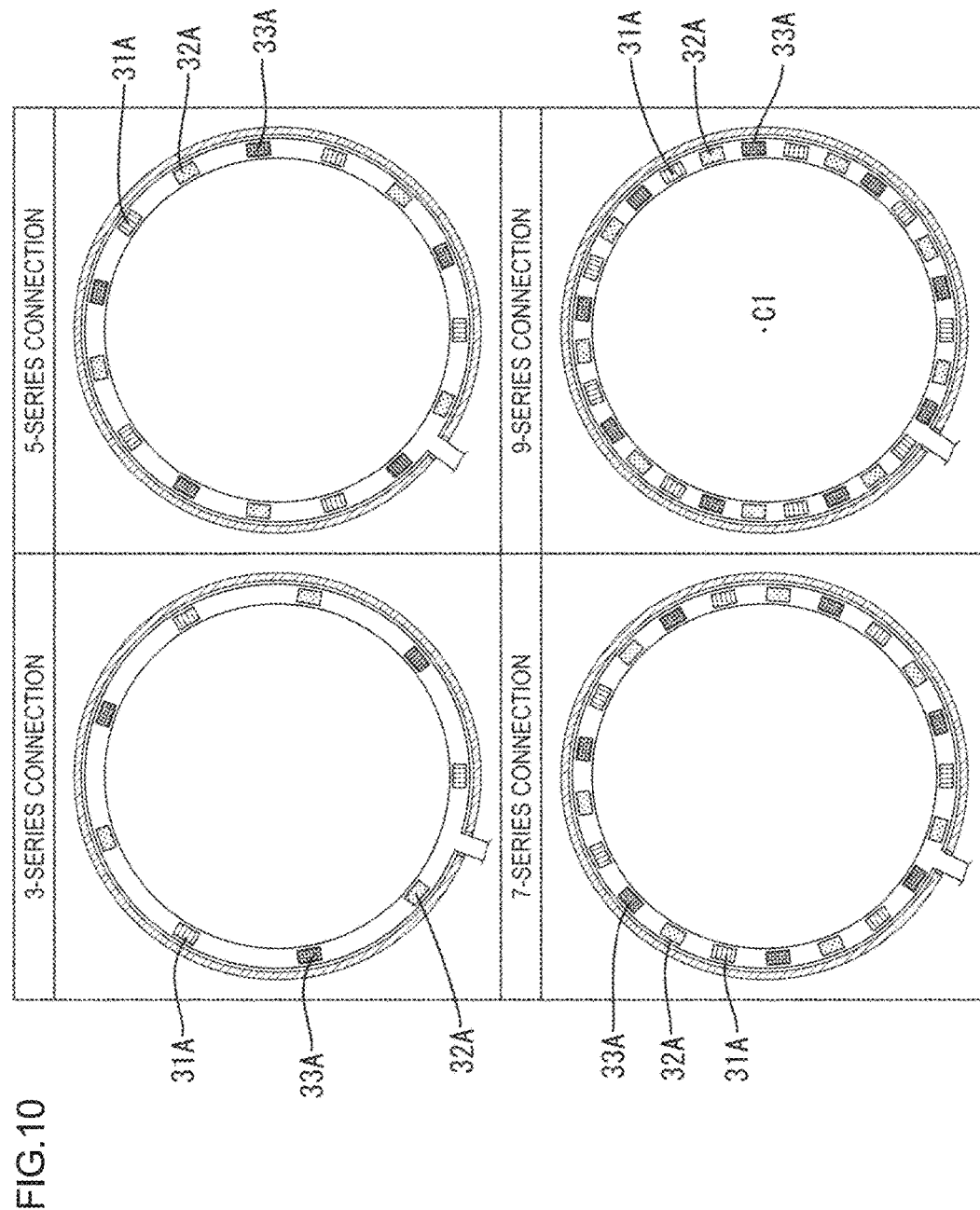
FIG. 10 is a table illustrating a configuration including three LED groups connected in parallel.
Figure 11:
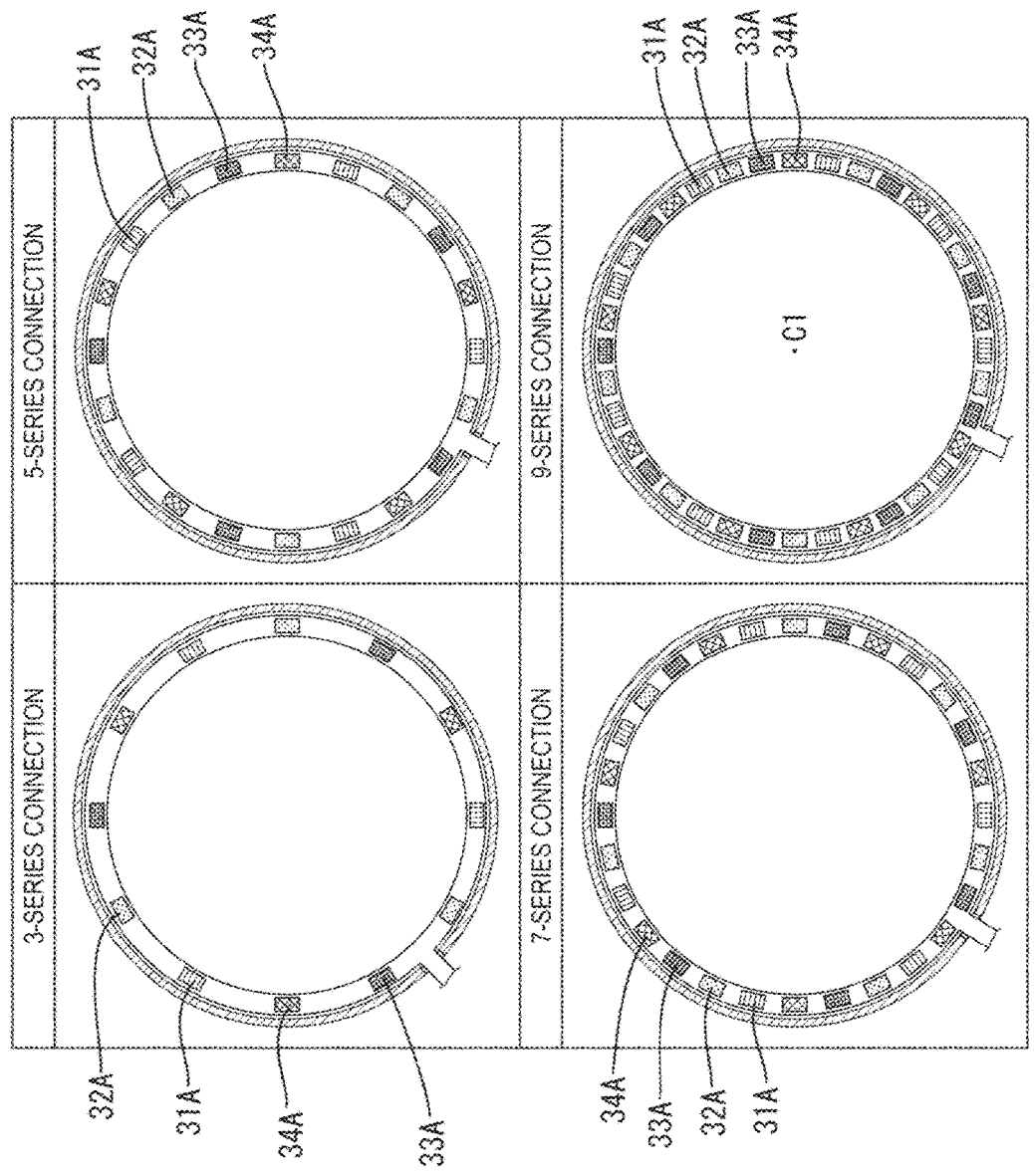
FIG. 11 is a table illustrating a configuration including four LED groups connected in parallel.

(1) The number of the LEDs that are connected in series and the number of the LEDs that are connected in parallel are not limited to those in the above embodiments but may be altered if necessary. Examples of the number of the LEDs connected in series and the number of the LEDs connected in parallel are illustrated in FIGS. 9 to 11. In FIG. 9, the number of LED groups connected in parallel is two and the number of the LEDs connected in series is an odd number. In the configuration of FIG. 9, the total number of the LEDs is even number and the LEDs each included in different LED groups are arranged opposite each other at an angular interval of 180°. FIG. 10 illustrates a configuration in which the number of LED groups connected in parallel is three and the number of LEDs connected in series is an odd number. In the configuration of FIG. 10, the total number of the LEDs is an odd number and the LEDs included in different LED groups are not arranged opposite each other at an angular interval of 180°. However, the opposite LEDs are likely to be arranged opposite each other at an angular interval of 180° by increasing the total number of the LEDs. FIG. 11 illustrates a configuration in which the number of the LED groups connected in parallel is four and the LEDs include LEDs 31A, 32A, 33A, 34A (light sources including at least first light sources and second light sources). The number of the LEDs connected in series is an odd number and is same. In the configuration of FIG. 11, the total number of the LEDs is an even number, and the LEDs included in different LED groups are arranged opposite each other at an angular interval of 180°. The number of the LED groups connected in parallel may be five or more. In such a configuration, effects of the present invention can be achieved.

Figure 12:
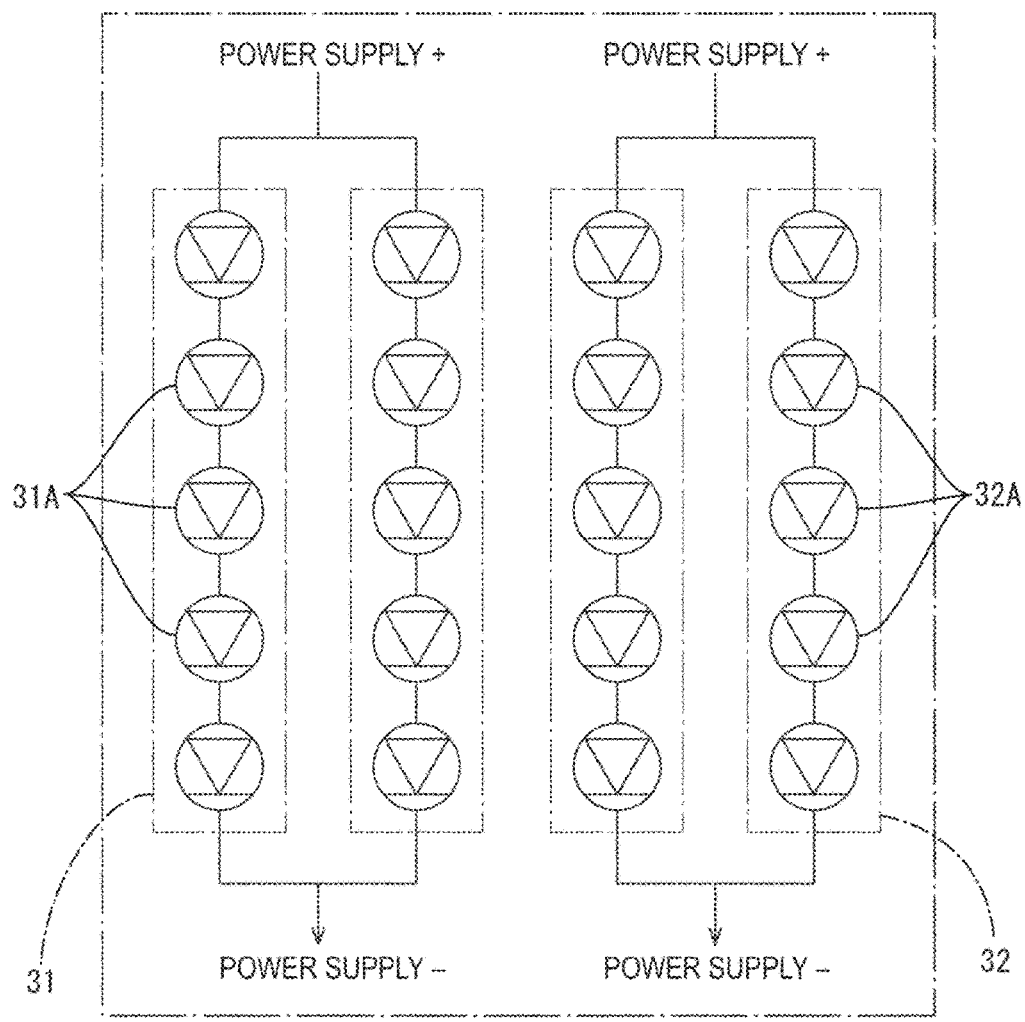
FIG. 12 is a diagram illustrating an electric configuration of LEDs according to another embodiment.

(2) In the above embodiments, the LED groups (for example, the first LED group 31 and the second LED group 32) are connected in parallel to each other. However, it is not limited thereto. As illustrated in FIG. 12, the first LED group 31 (the LEDs 31A) and the second LED group 32 (the LEDs 32A) may be electrically connected to different power supplies, respectively, as long as each LED group may not be connected in series.

(3) In each of the above embodiments, the liquid crystal panel is included as the display panel. However, a display panel of micro electro mechanical systems (MEMS) that displays images with using light from, a backlight device may be used. In the MEMES display panel, micro mechanical shutters as display pixels are planarly arranged, in a matrix and each of the mechanical shutters is controlled to be open or closed to adjust the amount of transmission light from the backlight device for every display pixel. Thus, an image of a certain gradation is displayed.

(4) In the above embodiments, the light guide plate 14 has a circular shape. However, it is not limited thereto. The light guide plate may have an ellipsoidal shape as long as it has a substantially circular shape.

(5) In the above embodiments, the LEDs 17 are arranged at equal intervals. However, it is not limited thereto. The LEDs 17 may be arranged at unequal intervals.

(6) In the above embodiments, the LEDs of different types (such as the LED 31A, 32B) are arranged alternately in the circumferential direction of the light entrance surface 14C. However, it is not limited thereto. Two or more LEDs (for example, the LEDs 31A) that are connected in series may be arranged adjacent to each other. In the above embodiments, the LED is used as the light source, however, it is not limited thereto. Organic EL may be used as the light source.

EXPLANATION OF SYMBOLS

10: liquid crystal display device (display device), 11: liquid crystal panel (display panel), 12, 112: backlight device (lighting device), 14: light guide plate, 14A: light exit surface, 14C: light entrance surface, 17: LED (light source), 31A: LED (first light source), 32A: LED (second light source), C1: center of light exit surface, R1: distance between each of the light sources and a center of the light exit surface

The invention claimed is:

1. A lighting device comprising:
    a light guide plate having a light exit surface having a substantially circular shape and a light entrance surface extending along an entire periphery of an outer edge of the light exit surface;
    a first light source opposite the light entrance surface; and
    a second light source opposite the light entrance surface, the second light source that is connected in parallel to the first light source or connected to a power supply different from a power supply that is connected to the first light source, the second light source arranged opposite from the first light source with having a center of the light exit surface therebetween
    the first light source includes first light sources that are arranged in a circumferential direction of the light entrance surface,
    the first light sources are connected in series,
    the second light source includes second light sources that are arranged in the circumferential direction of the light entrance surface, and
    the second light sources are connected in series;
    the first light sources and the second light sources are at least included in light sources,
    a total number of the light sources is an odd number,
    the light sources are arranged at equal intervals in an annular shape having a center corresponding to the center of the light exit surface, and
    a value obtained by (R1 * circumference of ratio)/N is 10 mm or less, R1 is a distance between each of the light sources and the center of the light exit surface, and N is the total number of the light sources.

2. The lighting device according to claim 1, wherein the first light sources and the second light sources are arranged alternately in the circumferential direction of the light entrance surface.

3. The lighting device according to claim 1, wherein
    the first light sources are arranged at equal intervals in an annular shape having a center corresponding to the center of the light exit surface and a number of the first light sources is an odd number, and
    the second light sources are arranged at equal intervals in an annular shape having a center corresponding to the center of the light exit surface and a number of the second light sources is an odd number.

4. A display device comprising:
    the lighting device according to claim 1; and
    a display panel display with using light from the lighting device.

* * * * *